United States Patent
McGaughey et al.

(10) Patent No.: US 6,876,944 B2
(45) Date of Patent: Apr. 5, 2005

(54) MOTOR SPEED ESTIMATION FOR STABILIZED MOTOR CONTROL

(75) Inventors: Donald R. McGaughey, Odessa (CA); Mohammed Tarbouchi, Kingston (CA); Ken Nutt, Lakefield (CA)

(73) Assignee: Her Majesty the Queen in right of Canada, as represented by the Minister of National Defence, Ottawa (CA)

( * ) Notice: Subject to any disclaimer, the term of this patent is extended or adjusted under 35 U.S.C. 154(b) by 0 days.

(21) Appl. No.: 10/777,113

(22) Filed: Feb. 13, 2004

(65) Prior Publication Data

US 2004/0225468 A1 Nov. 11, 2004

Related U.S. Application Data

(63) Continuation-in-part of application No. 10/241,390, filed on Sep. 4, 2002, now Pat. No. 6,708,134.

(51) Int. Cl.$^7$ ............................. G01P 3/00; G06F 15/00
(52) U.S. Cl. ....................................................... 702/145
(58) Field of Search .................. 702/145; 318/798–811, 318/700; 324/306–307; 73/146

(56) References Cited

U.S. PATENT DOCUMENTS

| | | | | |
|---|---|---|---|---|
| 4,825,132 A | * | 4/1989 | Gritter | 318/811 |
| 4,885,520 A | * | 12/1989 | Sugimoto et al. | 318/808 |
| 5,402,053 A | * | 3/1995 | Divan et al. | 318/768 |
| 5,644,205 A | * | 7/1997 | Nguyen Phuoc et al. | 318/801 |
| 5,959,429 A | * | 9/1999 | Tajima et al. | 318/799 |
| 5,969,498 A | * | 10/1999 | Cooke | 318/799 |
| 5,994,870 A | * | 11/1999 | Kaneko et al. | 318/798 |
| 6,005,365 A | * | 12/1999 | Kaneko et al. | 318/700 |
| 6,069,467 A | * | 5/2000 | Jansen | 318/802 |
| 6,242,885 B1 | * | 6/2001 | Ide et al. | 318/811 |

* cited by examiner

*Primary Examiner*—John Barlow
*Assistant Examiner*—Aditya Bhat

(57) ABSTRACT

A speed of a motor is estimated by determining a correlation between a current wave sensed at the motor and frequency pairs from a set of weighted frequency pairs representing the current wave. Components of a motor control signal are fit to a corresponding number of first orthogonal pairs in a set of weighted orthogonal pairs. The orthogonal pairs being orthogonal to the frequency pairs. Each of the frequency pairs are fit as the orthogonal pair subsequent to the first orthogonal pairs. The frequency pairs that provide a reduction in the mean squared error between the current wave and the set of weighted orthogonal pairs that satisfies a criteria are identified. Desired frequencies from the identified frequency pairs are then compared with a motor speed harmonic model to determine an estimation of the speed.

45 Claims, 8 Drawing Sheets

MOTOR SPEED ESTIMATION FOR STABILIZED MOTOR CONTROL

CROSS-REFERENCE TO RELATED APPLICATION

This application is a continuation-in-part of U.S. application Ser. No. 10/241,390, filed Sep. 4, 2002 now U.S. Pat. No. 6,708,134.

FIELD OF THE INVENTION

The present invention is relates to the field of motor speed control.

BACKGROUND

Motor controllers govern the operation of a motor in order to direct activation, speed, torque, motor shaft position and other such characteristics of the motor during operation. Alternating current (AC) variable speed (motor) drives (VSD) may have encoderless feedback for control of the motor. Encoderless speed controls or estimators are based on the principle that the motor speed can be estimated from a measurement of the current or voltage waveform at a motor connection. Motor rotation induces other frequencies in the current waveform due to the physical construction (rotor bars or winding gaps) of the motor's rotor. A speed estimate can be generated by detecting these induced speed related frequencies and comparing them to known mathematical models relating the induced frequencies to the motor speed. Such a known mathematical model may be, for example, "The Nature of Induction Machines", P. Alger; Gordon and Breach, New York, 1965.

SUMMARY

In accordance with one aspect of the present invention there is provided a method of estimating a speed of a motor comprising: determining a correlation between a current wave sensed at the motor and frequency pairs from a set of weighted frequency pairs representing the current wave; fitting components of a motor control signal to a corresponding number of first orthogonal pairs in a set of weighted orthogonal pairs, the orthogonal pairs being orthogonal to the frequency pairs; fitting each of the frequency pairs as the orthogonal pair subsequent to the first orthogonal pairs; identifying the frequency pairs that provide a reduction in the mean squared error between the current wave and the set of weighted orthogonal pairs that satisfies a criteria; and comparing desired frequencies from the identified frequency pairs with a motor speed harmonic model to determine an estimation of the speed.

In accordance with another aspect of the present invention there is provided a method of estimating a speed of a motor using a current wave sensed at the motor, the method comprising: determining a correlation between a current wave sensed at the motor and frequency pairs from a set of weighted frequency pairs representing the current wave; fitting components of a motor control signal to a corresponding number of first orthogonal pairs in a set of weighted orthogonal pairs, the orthogonal pairs being orthogonal to the frequency pairs; fitting each of the frequency pairs as the orthogonal pair subsequent to the first orthogonal pairs; determining a reduction for each of the frequency pairs in a mean squared error between the current wave and the set of weighted orthogonal pairs according to a mean squared error between the current wave and the first orthogonal pairs; determining the reductions that satisfy a criteria and the corresponding frequency pairs; removing unwanted frequencies from the determined corresponding frequency pairs; and comparing the remaining frequencies from the determined corresponding frequency pairs with a motor speed harmonic model to determine an estimate for the speed.

In accordance with a further aspect of the present invention there is provided a method of estimating a motor speed comprising: determining a correlation between a current wave sensed at the motor and frequency pairs from a set of weighted frequency pairs representing the current wave; fitting components of a motor control signal to a corresponding number of first orthogonal pairs in a set of weighted orthogonal pairs, the orthogonal pairs being orthogonal to the frequency pairs; comparing a subharmonic from the current wave with a harmonics speed model to identify regions in which to locate a corresponding harmonic, the subharmonic having a frequency less than a motor control signal; identifying a harmonics pair of frequencies in the regions having a separation from each other of no greater than a smallest harmonic of the motor control signal, wherein one of the frequencies is the harmonics pair of the corresponding harmonic; and comparing the harmonics pair with the harmonics speed model to determine an estimate for the speed.

In accordance with yet another aspect of the present invention there is provided a system for estimating a motor speed comprising: a correlation mechanism for determining a correlation between a current wave sensed at the motor and frequency pairs from a set of weighted frequency pairs representing the current wave; a fitting mechanism for fitting components of a motor control signal to at corresponding number of first orthogonal pairs in a set of weighted orthogonal pairs and fitting each of the frequency pairs as the orthogonal pair subsequent to the first orthogonal pairs, the orthogonal pairs being orthogonal to the frequency pairs; an mse reduction mechanism for determining a reduction in the mean squared error between the current wave and the set of weighted orthogonal pairs; a pair comparison mechanism for identifying the frequency pairs having a reduction that satisfies a criteria; a speed estimation mechanism for comparing desired frequencies from the identified frequency pairs with a motor speed harmonic model to determine an estimation of the speed; and a controller in communication with the correlation mechanism, the fitting mechanism, the mse reduction mechanism and the speed estimation mechanism for coordinating the process of estimating the motor speed.

In accordance with an aspect of the present invention there is provided a system for estimating a motor speed comprising: a correlation mechanism for determining a correlation between a current wave sensed at the motor and frequency pairs from a set of weighted frequency pairs representing the current wave; a fitting mechanism for fitting components of a motor control signal to a corresponding number of first orthogonal pairs in a set of weighted orthogonal pairs, the orthogonal pairs being orthogonal to the frequency pairs; a region determination mechanism for comparing a subharmonic from the current wave with a harmonics speed model to identify two regions in which to locate a corresponding harmonic, the subharmonic having a frequency less than a motor control signal; a corresponding frequencies mechanism for identifying a harmonics pair of frequencies in the two regions having a separation from each other no greater than a smallest harmonic of the motor control signal, wherein one f the frequencies in the harmonics pair is the corresponding harmonic; a speed estimation mechanism for comparing desired frequencies from the identified harmonics pairs with a harmonics speed model to determine an estimation of the speed; and a controller in communication with the correlation mechanism, the fitting mechanism, the mse reduction mechanism and the speed estimation mechanism for coordinating the process of estimating the motor speed.

In accordance with an aspect of the present invention there is provided a computer readable medium having stored thereon computer-executable instructions for estimating a speed of a motor comprising: determining a correlation between a current wave sensed at the motor and frequency pairs from a set of weighted frequency pairs representing the current wave; fitting components of a motor control signal to a corresponding number of first orthogonal pairs in a set of weighted orthogonal pairs, the orthogonal pairs being orthogonal to the frequency pairs; fitting each of the frequency pairs as the orthogonal pair subsequent to the first orthogonal pairs; identifying the frequency that provide a reduction in the mean squared error between the current wave and the set of weighted orthogonal pairs that satisfies a criteria; and comparing desired frequencies from the identified frequency pairs with a motor speed harmonic model to determine an estimation of the speed.

In accordance with an aspect of the present invention there is provided a computer readable medium having stored thereon computer-executable instructions for estimating a motor speed comprising: determining a correlation between a current wave sensed a the motor and frequency pairs from a set of weighted frequency pairs representing the current wave; fitting components of a motor control signal to a corresponding number of first orthogonal pairs in a set of weighted orthogonal pairs, the orthogonal pairs being orthogonal to the frequency pairs; comparing a subharmonic from the current wave with a harmonics speed model to identify regions in which to locate a corresponding harmonic, the subharmonic having a frequency less than a motor control signal; identifying a pair of frequencies in the regions having a separation from each other no greater than a smallest harmonic of the motor control signal, wherein one of the frequencies in the pair is the corresponding harmonic; and comparing the pair of frequencies with the motor speed harmonic model to determine an estimate for the speed.

In accordance with an aspect of the present invention there is provided a computer readable medium having stored thereon computer-executable instructions for estimating a speed of a motor using a current wave sensed at the motor, the method comprising: determining a correlation between a current wave sensed at the motor and frequency pairs from a set of weighted frequency pairs representing the current wave; fitting components of a motor control signal to a corresponding number of first orthogonal pairs in a set of weighted orthogonal pairs, the orthogonal pairs being orthogonal to the frequency pairs; fitting each of the frequency pairs as the orthogonal pair subsequent to the first orthogonal pairs; determining a reduction for each of the frequency pairs in a mean squared error between the current wave and the set of weighted orthogonal pairs according to a mean squared error between the current wave and the first orthogonal pairs; determining the reductions that satisfy a criteria and the corresponding frequency pairs; removing unwanted frequencies from the determined corresponding frequency pairs; and comparing the remaining frequencies from the determined corresponding frequency pairs with a motor speed harmonic model to determine an estimate for the speed.

BRIEF DESCRIPTION OF THE DRAWINGS

The present invention will be described in conjunction with the drawings in which.

DETAILED DESCRIPTION

Figure 1:
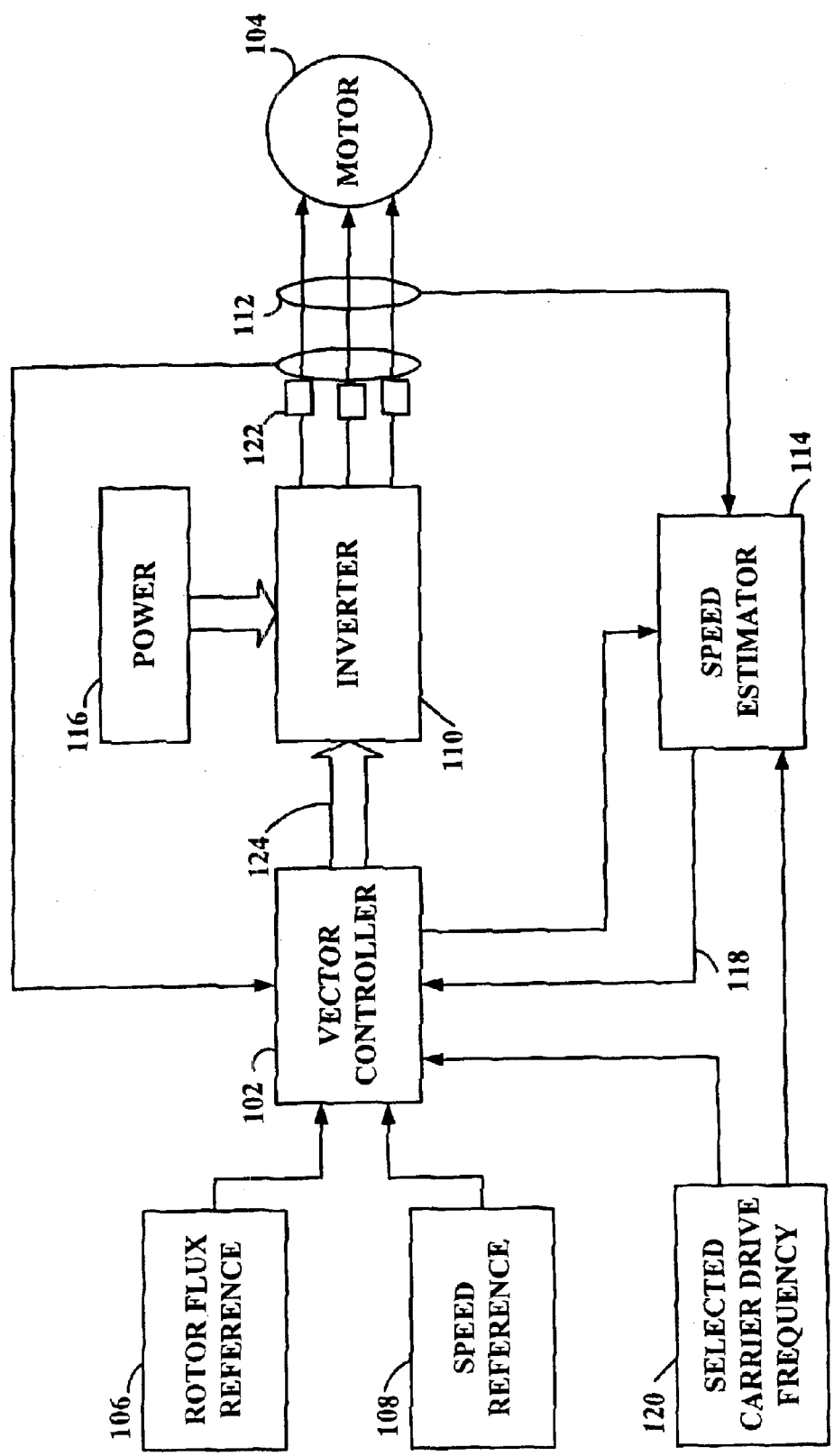
FIG. 1 illustrates a motor control system according to an embodiment of the present invention.

FIG. 1 illustrates a motor control system 100 according to an embodiment of the present invention. A vector controller 102 in the motor control system 100 drives an AC induction motor 104 via an inverter 110 and motor drive connections 112. The motor 104 is driven by a known frequency, the fundamental frequency, which is produced by the vector controller 102. The vector controller 102 receives information from a rotor flux reference 106, a speed reference 108 and an estimated speed of the rotor of the motor 104 from a speed estimator 114. Based on this information the vector controller 102 provides control signals 124 to the inverter 110 for control of the flow of power from a power source 116 to the motor 104. As the inverter 110 receives the control signals 124 from the vector controller 102, power from the power source 116 to the motor 104 may be regulated thereby.

The AC induction motor 104 includes a stator and the rotor (not shown) that rotates in response to the power provided to the motor 104. Current induced in the rotor as a result of a magnetic field produced by power supplied to the stator includes frequencies representative of the rate of rotation of the rotor and frequencies produced during rotation due to the physical construction of the rotor (e.g. rotor bars or winding gaps, etc.). This current is measured by sensors 122 at the motor drive connections 112 and forms the current wave from which the speed estimator 114 derives an estimate of the motor speed.

The rotor flux reference 106 is a measure of the rotor flux-linkage and provides a reference frame for measurement of torque in the motor 104. This reference frame can be used to control the torque by regulating the rotor flux-linkage and stator current.

The speed reference 108 is an indication of the desired operating speed of the rotor. The vector controller 102 uses the speed reference 108 as a baseline against which the motor speed obtained from the speed estimator 114 can be compared. The control signals 124 produced by the vector controller 102 are generated to control the motor 104 to align the motor speed with the speed reference 108. That is, the fundamental frequency, also called the carrier drive frequency (CDF), or the amplitude of the CDF produced by the vector controller 102 is generated to adjust the speed of the motor 104 so that it is the same as the speed reference 108.

A voltage feedback may be provided from the motor drive connections 112 to the vector controller 102.

The vector controller 102 provides the speed estimator 114 with the CDF 1118. The vector controller 102 can be based on any of a number of known vector control methods, such as the one set forth in "Vector Control of AC Machines," P. Vas; Oxford Science Publications, 1990. For a synchronous motor a motor speed controller similar to the vector controller 102 may be used.

The speed estimator 114 determines an estimate of the motor speed based on samples of the current wave sensed by the sensors 122 at the motor drive connections 112 and the CDF 118. For low speed operations, the speed estimator 114 alternatively receives a selected carrier drive frequency (SCDF) 120 from the vector controller 102.

The CDF 118 provided to the speed estimator 114 is the carrier drive frequency produced by the vector controller 104 at the time when the current samples where obtained from the motor drive connections 112. In order to provide a constant CDF during current wave obtainment, the speed estimator 114 may inform the vector controller 102 that the current at the motor drive connections 112 is being sampled. In response, the vector controller 102 may produce a constant CDF for a predetermined amount of time during which the speed estimator 114 obtains current wave samples from the sensors 122.

When the CDF values are small and the motor 104 is operating at only a small fraction of the base speed then the CDF 118 and the SCDF 120 may form the control signal 124. The SCDF 120 is of a higher frequency but lower amplitude than the CDF 118. The CDF 118 and the SCDF 120 are added together to produce speed related harmonics in the current wave from the sensors 122 to be detected by the speed estimator 114. The SCDF 120 is selected such that the speed related harmonics have a sufficient separation for detection. Although adding the SCDF 120 decreases the motor's efficiency due to waste of some power, the SCDF 120 enables the speed estimator 114 to estimate low motor speeds where the frequencies induced by the CDF 118 are closely spaced together (e.g. 1 Hz) making it hard to distinguish them.

The SCDF 120 may be a preset frequency used regardless of the speed (e.g. 30 Hz or 60 Hz for all occasions that the SCDF 120 is used).

The speed estimator 114 uses the CDF 118/SCDF 120 and the sampled current wave in a Real Time Fast Orthogonal Search (RTFOS) process to estimate harmonics representative of the motor speed in order to produce the motor speed estimate.

The inverter 110 receives the control signals 124 from the vector controller 102 to control flow of power from the power source 116 to the motor 104. When the speed received from the speed estimator 114 does not meet certain minimum criteria, the vector controller 102 enhances the CDF 118 by adding the SCDF 120 thereto. The combined CDF 118 and SCDF 120 form the control signal 124 that is provided to the inverter 110. The inverter 110 may be formed of an array of field effect transistors that couple power from the power source 116 to the motor 104.

Figure 2A:
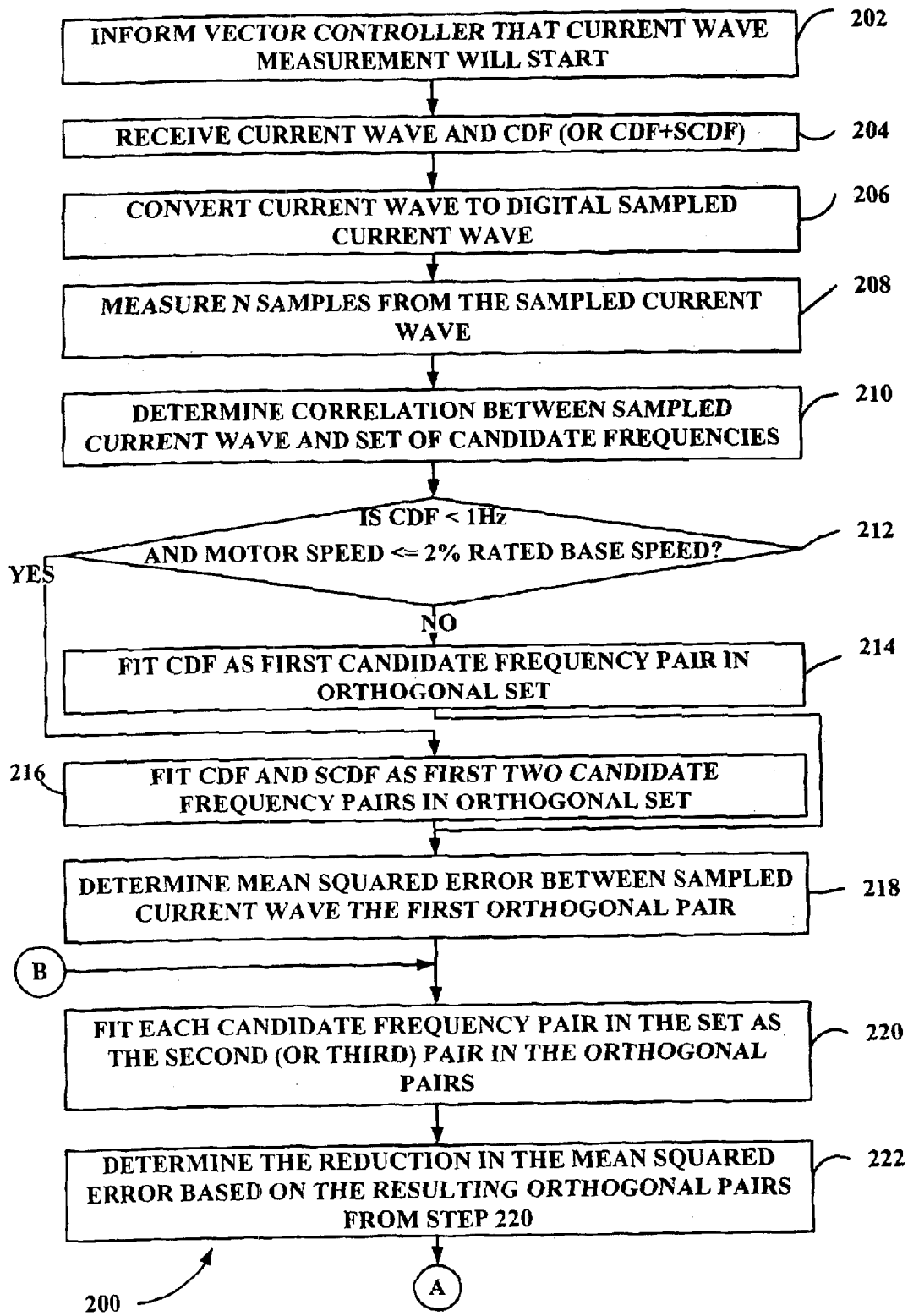
FIGS. 2A–B illustrate a method of estimating the speed of a motor according to a first embodiment of the present invention.
Figure 2B:
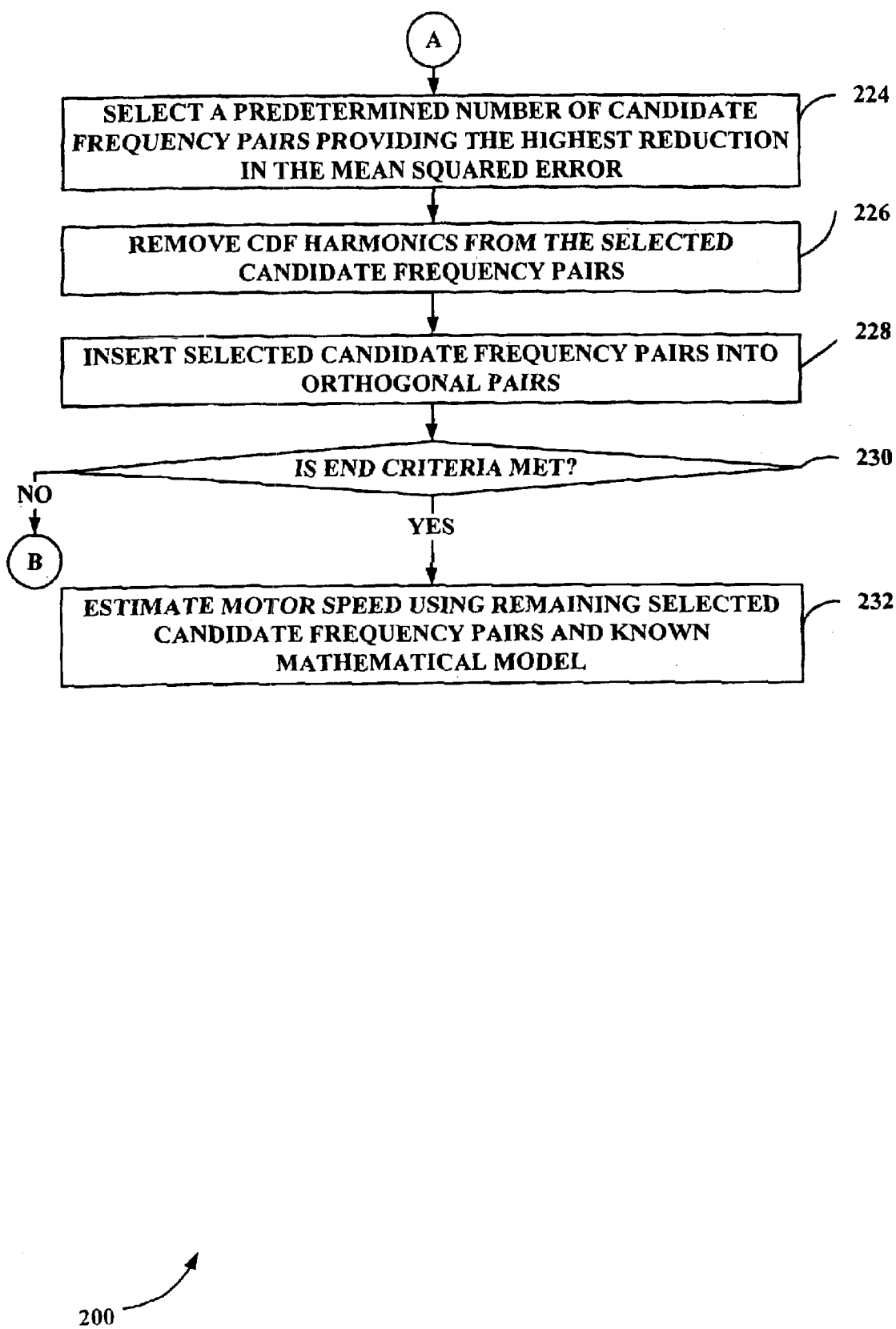

FIGS. 2A–B illustrate a method 200 of estimating motor speed by the speed estimator 114 according to an embodiment of the present invention. The method 200 is based on the Fast Orthogonal Search (FOS) method. FOS uses a set of non-orthogonal functions (e.g. a portion of a sine and a portion of a cosine wave) and fits them to a sampled signal (e.g. the current wave). FOS searches for frequencies with a period longer than a specific sampling window as well as those with a fractional number of periods in the sampling window.

When the motor 104 is in operation current is induced in the motor drive connections 112 from the rotor of the motor 104. If the CDF is small then the vector controller 102 may add the SCDF to the CDF, thus the SCDF may also be received in step 204. The sensors 122 connected to the motor drive connections 112 detect and measure this current wave. The vector controller 102 is informed in step 202 that the current wave from the motor drive connections 112 is going to be measured so that the vector controller 102 can produce a constant CDF.

The measured current wave is received from the sensors 122 and the CDF is received from the vector controller 102 in step 204. The measured current wave is converted to a digital sampled current wave in step 206. If the sensors 122 detecting the current wave provide a sampled current wave that is already digital then step 206 need not be performed. A predetermined number of samples N of the current wave are measured in step 208. Each of the N samples may be taken such that each sample is separated by a fixed amount of time from consecutive samples. The amount of time spent collecting the samples may depend on the number of speed estimates per second as limited by the ability of the speed estimator 114 to estimate the speed and store the estimated speed or measured samples. Accuracy of the vector controller 102 (i.e. speed regulator) improves with an increase in the number of speed estimates per second that are measured. If 6 to 10 speed estimates per second are produced by the speed estimator 114 then control of the motor 104 operating below 2% of the base rated motor speed will generally be stable.

The current wave samples can be modeled as a weighted sum of candidate frequency pairs by:

$$y(n) = \sum_{m=0}^{M} a_m p_m(n) + \zeta(n) \quad (1)$$

$$\text{where } p_{2m}(n) = \sin\left(\frac{2\pi f_m n}{F_s}\right) \text{ and } p_{2m+1}(n) = \cos\left(\frac{2\pi f_m n}{F_s}\right) \quad (2)$$

where y(n) is the sampled current wave which is a weighted ($a_m$) combination of the candidate functions $p_m(n)$ and the error $\zeta(n)$ between y(n) and the functional expansion (sum of the weighted candidate functions). The candidate function pairs $p_{2m}(n)$ and $p_{2m+1}(n)$ representing the candidate function are based on the sampling frequency $F_s$ and the set of candidate frequencies $f_m$. The candidate frequency pairs are chosen to represent frequencies between 0 Hz and the CDF.

The sampled current wave is correlated to a set of candidate frequency pairs in step 210. The candidate frequency pairs are chosen to represent sine and cosine function pairs (e.g. the candidate functions) having particular frequencies of interest and remain the same every time the method 200 is executed. The sampled current wave can be represented by a weighted combination of candidate functions and an error. The candidate frequency pairs represent the candidate function from which the sampled current wave can be derived. A subset of candidate frequency pairs that is noncontiguous can be used as a means of reducing the number of calculations performed by the speed estimator 114.

Correlation of the current wave with the set of candidate frequency pairs may be performed via known correlation techniques or by using zero-filled, adjusted Fast Fourier Transform (FFT). In the case of the later correlation calculation, the set of candidate frequency pairs are chosen to correspond to frequency bins of the zero-filled FFT. Zeros are added to the sampled signal to increase their length, such as by adding 1024 zeros to the end of 1024 sample values to increase the set length to 2048. Zero-filling increases the number of candidate frequencies calculated for correlation by the FFT. If it is known that that the FFT is zero-filled, some of the multiplication and addition operations in the FFT algorithm can be removed.

The candidate frequency pairs are determined to correspond with the FFT bins and to have a higher frequency resolution than the FFT. The candidate frequency pairs are separated from each other by approximately four times the FFT bin size.

Correlation of the sampled current wave and the set of candidate frequency pairs may be performed using a modified Fast Fourier Transform (FFT) given by:

$$Y(k) = \sum_{n=0}^{N-1} y(n) e^{-j\frac{2\pi k}{M} n} \qquad (3)$$

where k is the frequency bin index, n is the time index and M is the number of samples in the time series after it has been zero-filled. This complex equation (3) can be expressed as sinusoids and cosinusoids resulting in:

$$Y(k) = \sum_{n=0}^{N-1} y(n)\cos\left(\frac{2\pi k n}{M}\right) - j\sum_{n=0}^{N-1} y(n)\sin\left(\frac{2\pi k n}{M}\right) \qquad (4)$$

The sampled current wave FFT is zero-filled to M points to increase the number of frequency bins calculated. Since the candidate frequencies should coincide with FFT bin frequencies and the resolution of the FFT is $R_{FFT}=F_s/M$ then $$f_m = \frac{kF_s}{M} \qquad (5)$$

where $0 \leq k \leq M/2$.

A suitable type of FFT is the real valued FFT with Decimation in Frequency (DIF). The DIF FFT processes the input in the order collected. Since the bottom half or three-quarters of the input is zero, the multiplication and addition operations required by these zero elements need not be performed, thus reducing the number of computations performed by the method 200.

While the sampled current wave y(n) can be represented as a weighted combination of candidate functions $p_m(n)$, the sampled current wave y(n) can also be presented by a combination of weighted orthogonal functions $w_m(n)$ and some error $\epsilon(n)$ as follows:

$$y(n) = \sum_{m=0}^{M} g_m w_m(n) + \varepsilon(n) \qquad (6)$$

where $g_m$ are the weights for the orthogonal functions.

When the weights $g_m$ relating the orthogonal functions $w_m(n)$ to the sampled current wave y(n) are determined they can be used to determine the weights am relating the non-orthogonal candidate functions $p_m(n)$ to y(n). The orthogonal functions are derived from the candidate functions and may be represented by orthogonal pairs similar to the candidate frequency pairs.

Such derivation of the orthogonal functions may be performed using a modification of the Gram-Schmidt orthogonalization algorithm. The Gram-Schmidt algorithm is described in "Fast Orthogonal Search for Array Processing and Spectrum Estimation," K. Adeney and M. Korenberg; IEE. Proc. Visual Image Signal Processing, Vol. 141, No. 1 February 1994, herein incorporated by reference.

If the CDF is not less than 1 Hz or the motor speed is greater than 2% base rated speed as determined in step 212 then the CDF is fit as the first candidate frequency pair in the orthogonal pairs set in step 214.

The process of fitting the candidate frequency pairs involves deriving a function orthogonal to all previously fitted functions based on the candidate frequency pair. As the orthogonal functions are derived, the weights of these orthogonal functions are determined as part of the fitting process.

An orthogonal function can be determined using the corresponding candidate function minus the weighted sum of previous orthogonal functions, as given by:

$$w_m(n) = p_m(n) - \sum_{r=0}^{m-1} \alpha_{mr} w_r(n) \qquad (7)$$

where $\alpha$ is an m×m matrix containing for Gram-Schmidt weights used to derive the orthogonal functions from the previous orthogonal functions Only half of the matrix a is used thus only the non-zero elements are stored thereby reducing the memory used to store $\alpha$.

The first orthogonal function is set equal to the first candidate pair (the CDF).

$$w_0(n)=p_0(n) \qquad (8)$$

A time correlation function is defined as:

$$D(m,r)=\overline{p_m(n)w_r(n)} \qquad (9)$$

and it can be shown that:

$$D(m,m)=\overline{w_m^2(n)} \qquad (10)$$

The weight $\alpha_{mr}$, relating $w_m$ to $w_r$ can be computed by:

$$\alpha_{mr} = \frac{\overline{p_m(n)w_r(n)}}{\overline{w_r^2(n)}} = \frac{D(m,r)}{D(r,r)} \qquad (11)$$

Since determining the orthogonal functions $w_n(n)$ is not required, as the weights $g_m$ are used to determined the weights $a_m$ of the non-orthogonal functions, D(m,r) can be determined as follows:

$$D(m,r) = \overline{p_m(n)p_r(n)} - \sum_{i=0}^{r-1} \alpha_{ri} D(m,i) \qquad (12)$$

The weights $g_m$ of the orthogonal series is:

$$g_m = \frac{C(m)}{D(m,m)} \qquad (13)$$

where  (14)

$$C(m) = \overline{y(n)p_m(n)} - \sum_{r=0}^{m-1} \alpha_{mr} C(r)$$

It can be shown that the weights relating the candidate functions to the sampled signal are given by:

$$a_m = \sum_{i=m}^{M} g_i v_i \qquad v_m = 1 \qquad (15)$$

where (16)

$$v_i = -\sum_{r=m}^{i-1} \alpha_{mr} v_r \qquad i = m+1, m+2, \ldots, M$$

If the CDF is less than 1 Hz and the motor speed is less than 2% rated base speed as determined in step 212 then the CDF is fit as the first candidate frequency pair and the SCDF is fit as the second candidate frequency pair in the orthogonal set in step 216.

After the first candidate frequency pair(s) has been fit in the orthogonal pairs in either step 214 or step 216, the mean squared error (MSE) between the orthogonal functions set in step 214 or step 216 and the sampled current wave is determined in step 218. The method 200 attempts to minimize the mean squared error between the orthogonal functions and the sampled current wave.

The mean squared error is given by:

$$\overline{\varepsilon^2(n)} = \overline{y^2(n)} - \sum_{m=0}^{M} g_m^2 \overline{w_m^2(n)} \qquad (8)$$

The term $g_m^2 \overline{w_{m^2(n)}}$ is the mean squared error reduction caused by adding the mth candidate frequency pair to the orthogonal set. Since each frequency component of the sampled current wave is composed of a sine and a cosine component, the mean squared error reduction for both the sine and cosine candidate of a particular frequency is determined and combined to form the overall mean squared error reduction for that frequency $f_m$.

Each candidate frequency pair in the set is fitted as the second frequency pair (or third if the SCDF is used) in the set orthogonal pairs in step 220 in a manner similar to the fittings in steps 216 and 214. Note that since the frequency corresponding to the CDF (or CDF and SCDF) has already been fit it will not be in the remaining candidate frequency pairs. The means squared error reduction for each additional pair in the orthogonal sets resulting from step 220 is determined in step 222.

After all of the candidate frequency pairs have been tried as the second pair (or third pair if the SCDF was used) in the orthogonal set and the resulting mean squared error reduction determined, a predetermined number of candidate frequency pairs providing the highest reduction in the mean squared error are selected in step 224.

Alternatively, all candidate pairs providing a reduction within a predetermined range of the highest mean squared error reduction may be selected. Selecting more than one candidate frequency pair at a time reduces the number of computations performed by the method 200.

The selected candidate frequency pairs are examined in step 226 to remove any pairs that are CDF harmonics. This may be done by looking for frequencies separated by specific amounts. The remaining selected candidate frequency pairs are inserted into eh orthogonal pairs in step 228

Steps 220 to 228 are repeated until a specified criteria is met as determined in step 230. The specified criteria may include fitting a determined number of candidate pairs, fitting enough candidate pairs to reduce the mean squared error to a certain threshold, continue to fit candidate pairs until there is no reduction in the mean squared error.

The remaining pairs are assumed to be motor speed harmonics. A speed estimate can be generated from the remaining selected candidate frequency pairs by comparing them to a known mathematical model relating the induced frequencies to the motor speed in step 232. An exemplary mathematical model suitable for use is described in "The Nature of Induction Machines," P. Alger; Gordon and Breach, New Work, 1965.

Figure 3:
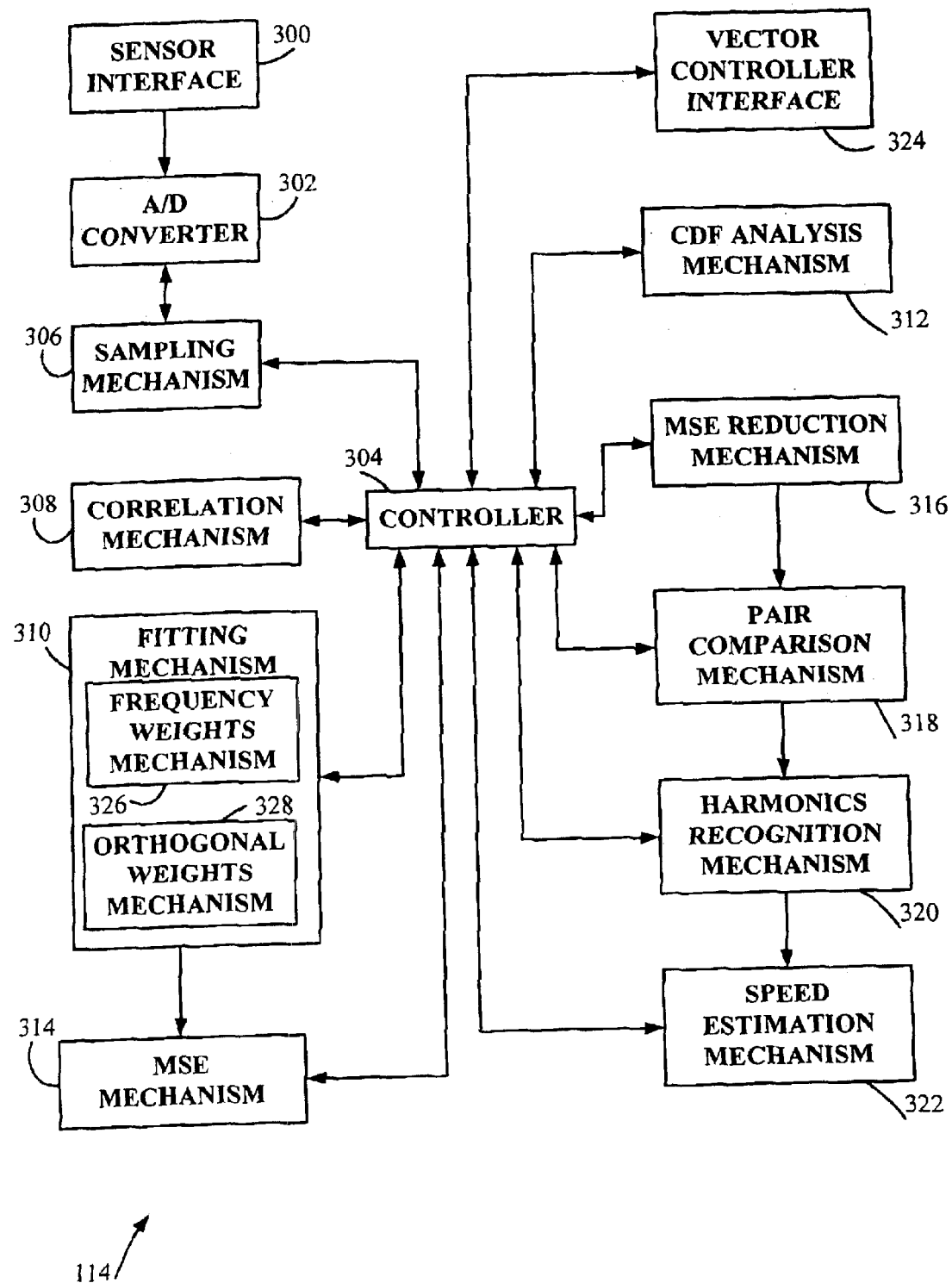
FIG. 3 illustrates a speed estimator of the motor control system according to an embodiment of the present invention.

FIG. 3 is a system diagram showing the speed estimator 114. The speed estimator 114 includes a controller 304 that interconnects a sampling mechanism 306, a correlation mechanism 308, a fitting mechanism 310, an MSE mechanism 314, a vector controller interface 324, a CDF analysis mechanism 312, an MSE reduction mechanism 316, a pair comparison mechanism 318, a harmonics recognition mechanism 320 and a speed estimation mechanism 322.

The controller 304 coordinates processing between these modules including facilitation of data movement and flow control.

The vector controller interface 324 interfaces with the vector controller 102 to send an indication that the speed estimator 114 is going to measure the current wave in the motor drive connections 112 thus allowing the vector controller 102 to send a constant CDF for a predetermined period of time. The CDF (or SCDF and CDF) that is produced by the vector controller 102 during this time is received at the speed estimator 114 by the vector controller interface 324.

A sensor interface 300 is connected to the sampling mechanism 306 through an A/D converter 302. The sensor interface 300 is in communication with the sensors 122 at the motor drive connections 112 to receive the current wave measured therefrom. The measured current wave received at the sensor interface 300 is provided to the A/D converter 302 for conversion from an analog signal to a digital signal, thus forming the sampled current wave. The key information in the current wave is about 60 db smaller than the CDF.

The A/D converter 302 may be any known A/D converter capable of handling such data. If the current wave received from the sensors 122 is already a digital signal then the current wave need not be processed by the A/D converter 302.

The sampling mechanism 306 receives the sampled current wave and extracts N samples therefrom to produce the sampled current wave that will be used to estimate the speed of the motor 104.

The correlation mechanism 308 receives the sampled current wave consisting of the N samples and determines a correlation between the sampled current wave and a set of candidate frequency pairs that are produced by the controller 304. The sampled current wave may be represented as a weighted sum of a subset of candidate frequency pairs.

The CDF analysis mechanism 312 determines whether the CDF from the vector controller 102 is less than 1 Hz and the motor speed is less than 2% rated base speed, indicating low speed operation of the motor 104. If the above holds true then the SCDF is used in addition to the CDF. That is, the CDF analysis mechanism 312 classifies a previous motor speed or the speed reference 108 as being either low or normal.

The fitting mechanism 310 fits the candidate frequency pairs in an orthogonal set, which may also be used to represent the sampled wave current. The first pair that is fit in the orthogonal set is the CDF. If the SCDF was used then the SCDF is fit as the second pair in the orthogonal set. The fitting mechanism 310 comprises a frequency weights mechanism 326 and an orthogonal weights mechanism 328.

The orthogonal weights mechanism 328 determines the weights for the orthogonal set based on the values of the frequency pairs. The frequency weights mechanism 326 determines weights for the candidate frequency pairs based on the orthogonal weights.

The MSE mechanism 314 determines the mean squared error between the orthogonal set and the sampled current wave. The MSE reduction mechanism 316 determines the mean squared error reduction when additional candidate frequency pairs are fit into the orthogonal set. The pair comparison mechanism 318 determines those pairs that provide the highest mean squared error reduction between the sampled current wave and the orthogonal set when they are added to the orthogonal set. The pair comparison mechanism 318 may select a predetermined number of candidate frequency pairs that provide the highest mean squared error reduction or may select all candidate pairs providing a mean squared error reduction within a determined range of the highest value.

The harmonics recognition mechanism 320 determines those candidate frequency pairs from the selected candidate frequency pairs determined by the pair comparison mechanism 318 that are harmonics of the CDF and removes them from the selected candidate frequency pairs.

The speed estimation mechanism 322 estimates the speed of the motor 104 based on the selected candidate frequency pairs remaining after the CDF harmonics have been removed. The speed estimation is based on a comparison of the remaining selected candidate frequency pairs with a known mathematical model relating the induced frequencies in the motor drive connections 112 with the motor speed.

Figure 4:
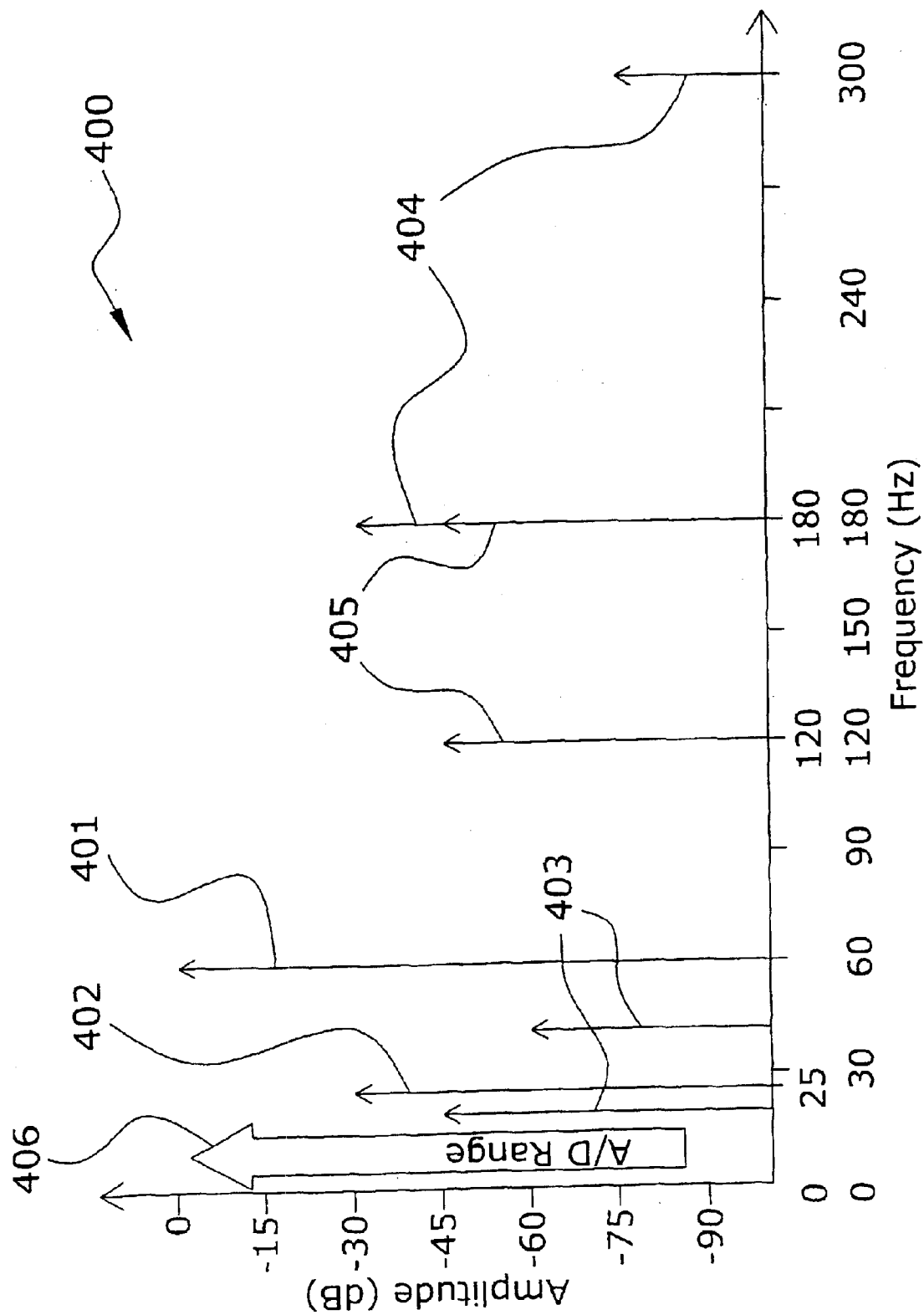
FIG. 4 illustrates the frequency spectrum in which the speed estimator detects speed related information.

FIG. 4 depicts a frequency spectrum graph of the measured current wave, filtered and matched for a speed estimate by the speed estimator 114. The sampling sensitivity of the A/D converter 302 is shown 406 with reference to the vertical (amplitude) axis. In this example, the CDF is 60 Hz and drives the motor 104 at the rated base speed 401 with resulting unwanted odd harmonics 404 (even and other harmonics of similar amplitude are not shown for clarity). A speed-induced sub-harmonic frequency 402 is shown at 25 Hz that indicated a rough estimate of motor speed as:

25 Hz/CDF(or CDF and SCDF)(60 Hz)×rated base speed=750 rpm where the example rated base speed is 1800 RPM. Other unrelated noise frequencies are shown to either side 403 of the sub-harmonic. Examples of two speed-induced harmonics are shown at 120 Hz and 180 Hz 405 separated by 2 times the CDF. Note that the second frequency, 180 Hz, coincides with a harmonic of the CDF; consequently, the frequency may not be used in the final speed estimate determination.

Figure 5A:
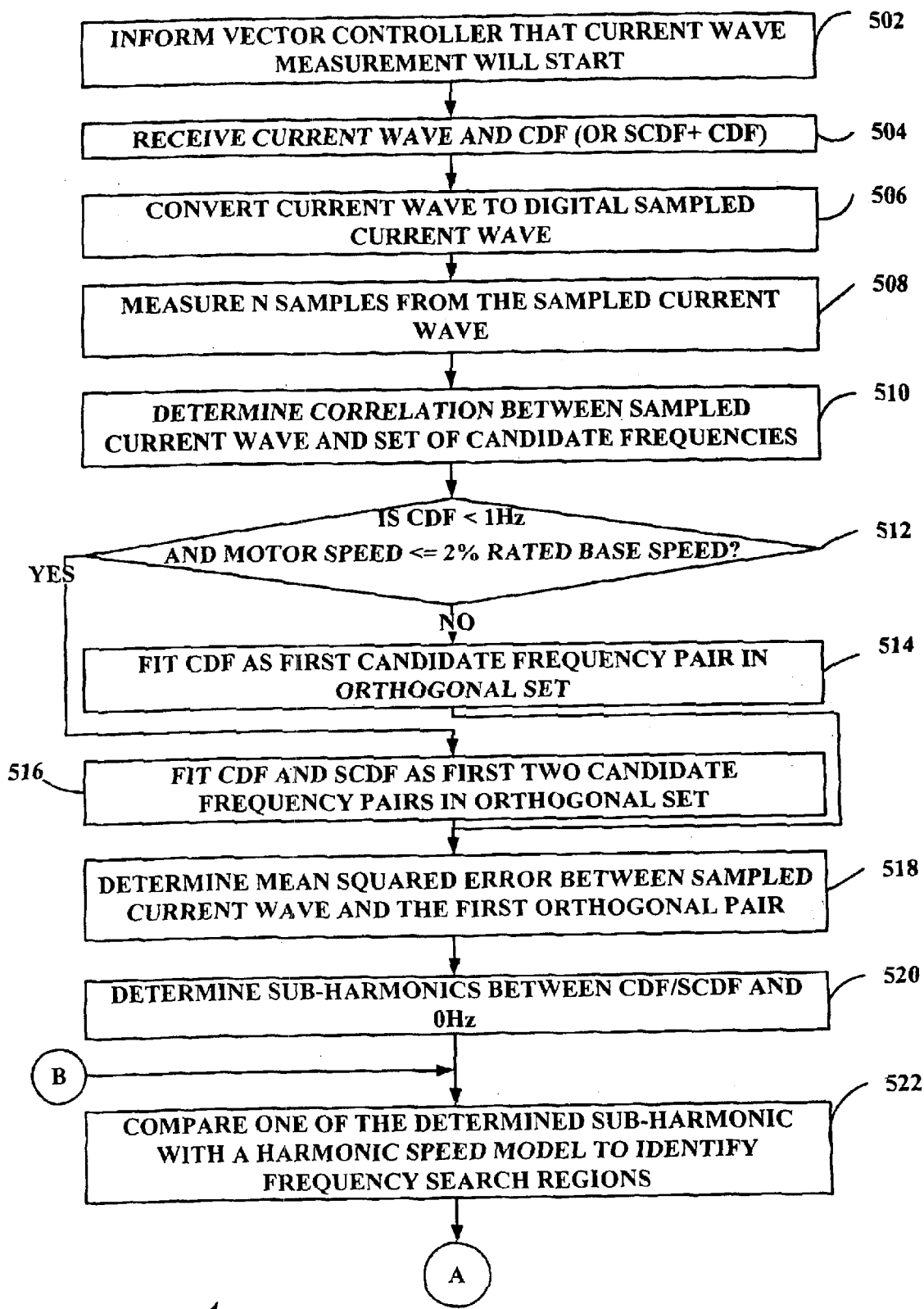
FIGS. 5A–B illustrate a method of estimating the speed of a motor according to a second embodiment of the present invention.
Figure 5B:
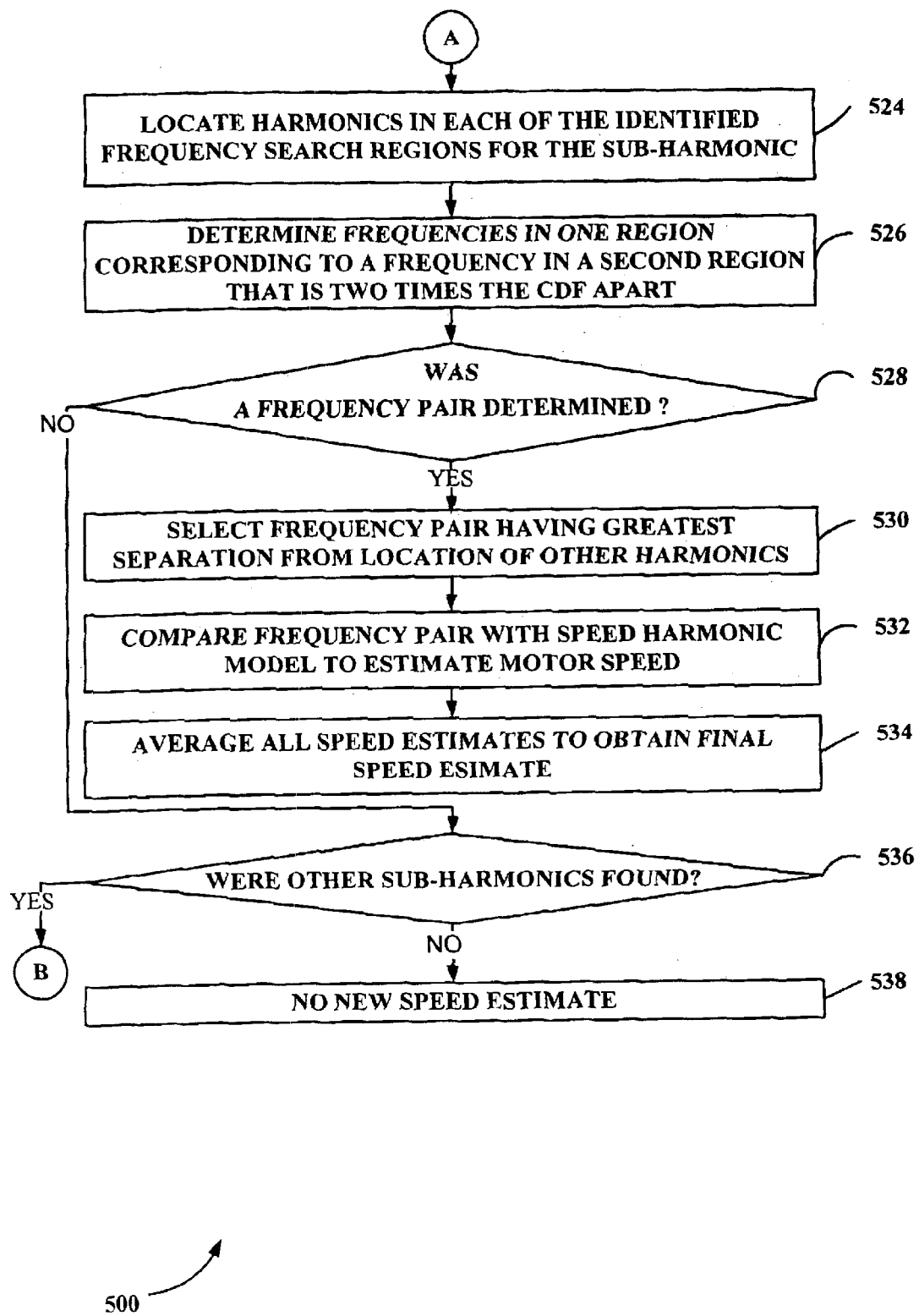

FIGS. 5A-B illustrate a speed estimation method 500 according to a second embodiment of the present invention. Steps 502 to 518 of the method 500 corresponding with step 202 to 218 of the method 200 of the first embodiment and will not be discussed in detail.

After the mean squared error between the orthogonal set containing the CDF (or CDF and SCDF) and the sampled current wave has been determined, a search for possible speed-induced sub-harmonic frequencies is performed between the CDF (or SCDF) and 0 Hz in step 520. Sub-harmonic frequencies are those frequencies that are speed-induced frequencies harmonics but have a lower frequency than the CDF (or SCDF).

Each speed-induced sub-harmonic determined in step 520 is compared to a model relating the induced frequencies with the estimated speed. The purpose of this comparison is to locate two separate frequency regions where corresponding speed induced harmonics would have to be in order to make a pattern match with the speed model in step 522. These frequency regions correspond with the FFT bins used in the correlation in step 510. These regions may be equivalent to 1 FFT bin higher and 1 FFT bin lower than the identified sub-harmonics.

Any frequency harmonics of the sub-harmonics in each identified frequency region are then located in step 524. During a search of each region various techniques may be used to filter and/or discriminate against other noise carriers using learned methods to avoid the time wasted detecting and processing erroneous signals (e.g. an inversion of the induced harmonics).

The speed-induced frequency harmonics found are examined to determine if the harmonic frequencies correspond to a second harmonic frequency whose frequency is two times the CDF away in step 526 or two harmonic frequencies that are separated by the smallest harmonic of the control signal (e.g. CDF or CDF+SCDF).

In step 528 it is determined whether there were any frequency pairs determined in step 526. If there was at least one frequency pair was determined then the frequency pair that has the greatest separation from the location of known harmonics (e.g. CDF harmonics) is selected in step 530 to avoid unwanted motor rather than speed related frequencies. The selected frequency pair is compared in step 532 to the known harmonic speed model to estimate the motor speed. If there is more than one valid speed estimate, the estimates are averaged to result in a final value to drive the vector controller 104 in step 534.

If there were no frequency pairs determined in step 528 then it is determined in step 536 if other sub-harmonics were found. If other sub-harmonics were found then steps 522 to 528 are repeated. If no other sub-harmonics were found then no new speed estimate is produced in step 538.

Matching the two frequencies as in step 526 is not the only means of separating speed-induced harmonics from unwanted harmonics. Frequency pairs that coincide with known harmonics may be discarded. These steps may be replaced with more sophisticated pattern matching algorithms and a speed tracking routine.

Figure 6:
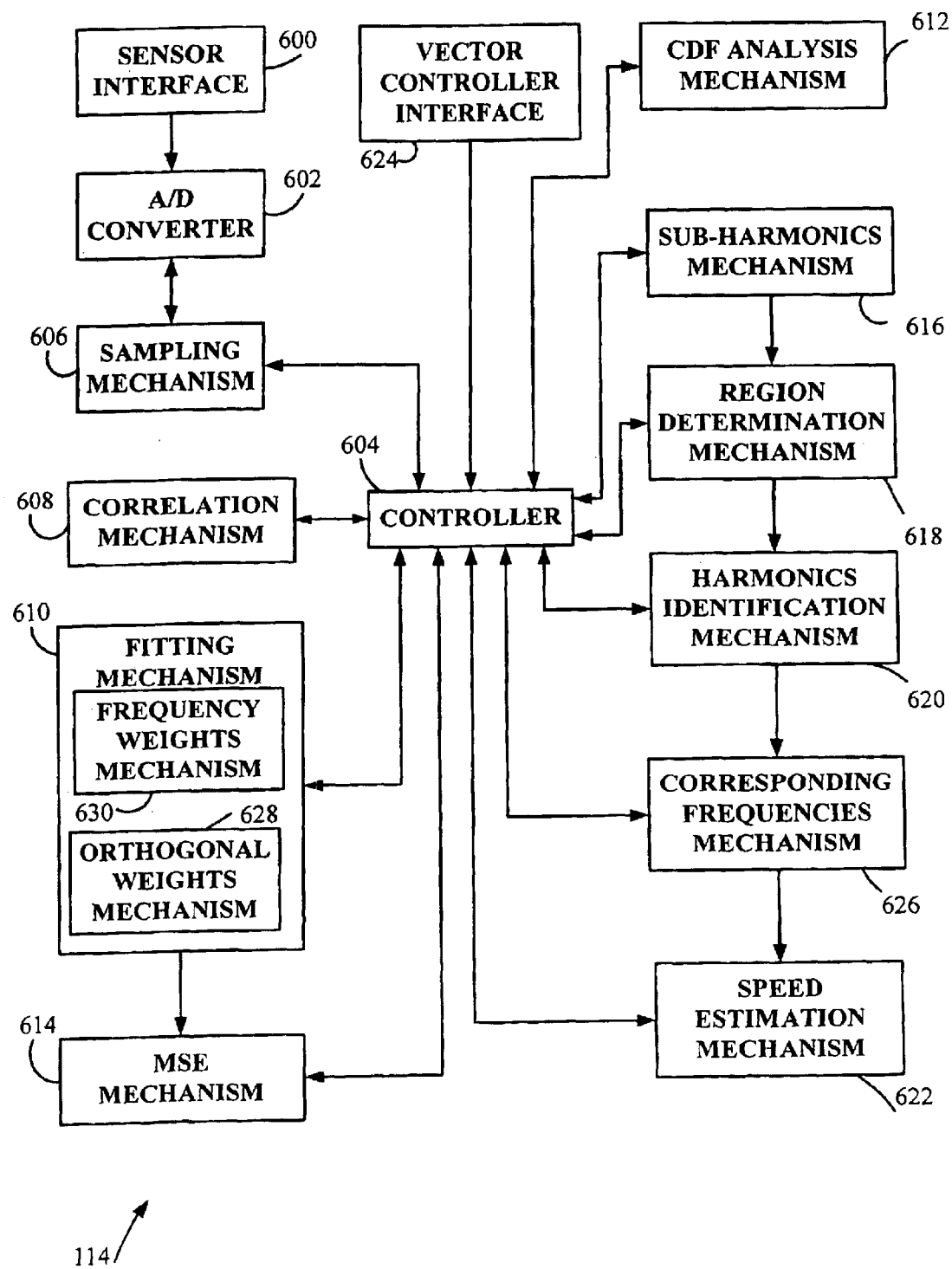
FIG. 6 illustrates a speed estimator of the motor control system according to the second embodiment.

FIG. 6 is a system diagram showing the speed estimator 114 according to the second embodiment. The speed estimator 114 includes a controller 604 that interconnects a sampling mechanism 606, a correlation mechanism 608, a fitting mechanism 610, an MSE mechanism 614, a vector controller interface 624, a CDF analysis mechanism 612, a sub-harmonics mechanism 615, a region determination mechanism 618, a harmonics identification mechanism 610 a corresponding frequencies mechanism 626 and a speed estimation mechanism 622.

The controller 604 coordinates processing between these modules including facilitation of data movement and flow control.

The vector controller interface 624 interfaces with the vector controller 102 to send an indication that the speed estimator 114 is going to measure the current wave in the motor drive connections 112 thus allowing the vector controller 102 to send a constant CDF for a predetermined period of time. The CDF (or SCDF and CDF) that is produced by the vector controller 102 during this time is received at the speed estimator 114 by the vector controller interface 624.

A sensor interface 600 is connected to the sampling mechanism 606 through an A/D converter 602. The sensor interface 600 is in communication with the sensors 122 at the motor drive connections 112 to receive the current wave measured therefrom. The measured current wave received at the sensor interface 300 is provided to the A/D converter 602 for conversion from an analog signal to a digital signal, thus forming the sampled current wave. The key information in the current wave is about 60 db smaller than the CDF.

The A/D converter 602 may be any known A/D converter capable of handling such data. If the current wave received from the sensors 122 is already a digital signal then the current wave need not be processed by the A/D converter 6302.

The sampling mechanism 606 receives the sampled current wave and extracts N samples therefrom to produce the sampled current wave that will be used to estimate the speed of the motor 104.

The correlation mechanism 608 receives the sampled current wave consisting of the N samples and determines a correlation between the sampled current wave and a set of candidate frequency pairs that are produced by the controller 604. The sampled current wave may be represented as a weighted sum of a subset of candidate frequency pairs.

The CDF analysis mechanism 612 determines whether the CDF from the vector controller 102 is less than 1 Hz and the motor speed is less than 2% rated base speed, indicating low speed operation of the motor 104. If the above holds true then the SCDF is used in addition to the CDF. That is, the CDF analysis mechanism 312 classifies a previous motor speed or the speed reference 108 as being either low or normal.

The fitting mechanism 610 fits the candidate frequency pairs in an orthogonal set, which may also be used to represent the sampled wave current. The first pair that is fit in the orthogonal set is the CDF. If the SCDF was used then the SCDF is fit as the second pair in the orthogonal set. The fitting mechanism 610 comprises a frequency weights mechanism 630 and an orthogonal weights mechanism 628. The orthogonal weights mechanism 628 determines the weights for the orthogonal set based on the values of the frequency pairs. The frequency weights mechanism 630 determines weights for the candidate frequency pairs based on the orthogonal weights.

The MSE mechanism 614 determines the mean squared error between the orthogonal set and the sampled current wave.

The sub-harmonics mechanism 616 locations all speed-induced sub-harmonics in the current wave between 0 Hz and the CDF (or SCDF and CDF).

The region determination mechanism 618 compares one of the determined sub-harmonics with a harmonic speed model to identify frequency search regions.

The harmonics identification mechanism 620 locates speed-induced harmonics of the sub-harmonics in the identified frequency search regions in the current wave.

The corresponding frequencies mechanism 626 determines frequencies in one of the regions determined by the region determination mechanism 618 that have a corresponding frequency in the second region where there is a spread of two times the CDF between the two frequencies, or two harmonic frequencies that are separated by the smallest harmonic of the control signal (e.g. CDF or CDF+ SCDF. If more than one frequency pair is located then the frequency pair having the greatest separation from other harmonics is provided to the speed estimation mechanism 622.

The speed estimation mechanism 622 estimates the speed of the motor 104 based on the selected candidate frequency pairs remaining after the CDF harmonics have been removed. The speed estimation is based on a comparison of the remaining selected candidate frequency pairs with a known mathematical model relating the induced frequencies in the motor drive connections 112 with the motor speed. If multiple corresponding frequency pairs have been located then the speed estimate obtained from each of these pairs is averaged.

Embodiments of the present invention may be implemented in any conventional computer programming language. For example, embodiments may be implemented in a procedural programming language (e.g. "C") or an object oriented language (e.g. "C++"). Further embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g. a diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet or World Wide Web). Some embodiments of the invention may be implemented as a combination of both software (e.g. a computer program product) and hardware (termed mechanisms). Still other embodiments of the invention may be implemented as entirely hardware, or entirely software (e.g. a computer program product)."

It is apparent to one skilled in the art that numerous modifications and departures from the specific embodiments described herein may be made without departing from the spirit and scope of the invention.

What is claimed is:

1. A method of estimating a speed of a motor comprising:
 a) determining a correlation between a current wave sensed at the motor and frequency pairs from a set of weighted frequency pairs representing the current wave;
 b) fitting components of a motor control signal to a corresponding number of first orthogonal pairs in a set of weighted orthogonal pairs, the orthogonal pairs being orthogonal to the frequency pairs;
 c) fitting each of the frequency pairs as the orthogonal pair subsequent to the first orthogonal pairs;
 d) identifying the frequency pairs that provide a reduction in the mean squared error between the current wave and the set of weighted orthogonal pairs that satisfies a criteria; and e) comparing desired frequencies from the identified frequency pairs with a motor speed harmonic model to determine an estimation of the speed.

2. The method according to claim 1 wherein the step of determining a correlation comprises:

calculating a zero-filled fast fourier transform of the current wave using the frequency pairs, wherein the frequency pairs correspond to frequency index bins of the zero-filled fast fourier transform.

3. The method according to claim 1 wherein the step of fitting components of the motor control signal comprises:

determining the orthogonal weights of the first orthogonal pairs based on the values of the components; and determining the frequency weights of pairs in the set of frequency pairs corresponding to the first orthogonal pairs based on the determined orthogonal weights.

4. The method according to claim 1 wherein the step of fitting components of the motor control signal comprises:

determining if a previous motor speed is classified as low;

fitting a drive frequency component of the motor control signal as a first pair of the orthogonal pairs; and fitting a supplemental frequency component of the motor control signal as a second pair of the orthogonal pairs if the previous motor speed is classified as low.

5. The method according to claim 4 wherein the step of determining if a previous motor speed is classified as low comprises:

classifying the previous motor speed as low if the motor speed is less than 2% rated base motor speed.

6. The method according to claim 1 wherein the step of fitting each of the frequency pairs comprises:

determining the orthogonal weight of the subsequent orthogonal pair for each of the frequency pairs based on the value of each of the frequency pairs; and determining the frequency weight of a pair in the set of weighted frequency pairs corresponding to the subsequent pair based on the determined orthogonal weight of the subsequent orthogonal pair for each of the frequency pairs.

7. The method according to claim 1 wherein the step of identifying comprises:

determining a mean squared error between the first orthogonal pairs and the current wave;

determining reductions in the mean squared error between the orthogonal pairs and the current wave based on the addition of each of the frequency pairs as the subsequent orthogonal pair; and determining the frequency pairs that produce a reduction that satisfies the criteria.

8. The method according to claim 7 wherein the step of determining the frequency pairs comprises:

determining the frequency pairs that produce a reduction greater than a threshold.

9. The method according to claim 8 wherein the step of determining the frequency pairs comprises:

determining the frequency pairs that produce a reduction within a threshold of the highest reduction.

10. The method according to claim 1 further comprising:

repeating steps (b) to (d) until a performance criteria is satisfied.

11. The method according to claim 10 further comprising:

repeating steps (b) to (d) until a determined number of the frequency pairs in the set of weighted frequency pairs have been fit to the orthogonal pairs.

12. The method according to claim 10 further comprising:

repeating steps (b) to (d) until the mean squared error between the current wave and the set of weighted orthogonal pairs is below a determined threshold.

13. The method according to claim 10 further comprising:

repeating steps (b) to (d) until the reduction is less than a threshold.

14. The method according to claim 1 wherein the step of comparing comprises:

removing frequencies that are harmonics of the components of the motor control signal from the identified frequency pairs to form the desired frequencies.

15. The method according to claim 1 wherein the step of fitting components of the motor control signal comprises:

determining the first orthogonal pairs based on an orthogonalization algorithm using the components of the motor control signal.

16. The method according to claim 15 wherein the step of fitting components of the motor control signal further comprises:

calculating weights of the first orthogonal pairs.

17. The method according to claim 15 wherein the orthogonalization algorithm comprises the Gram-Schmidt algorithm or the modified Gram-Schmidt algorithm.

18. The method according to claim 1 wherein the step of fitting each of the frequency pairs comprises:

determining the subsequent pair based on an orthogonalization algorithm using the components of the motor control signal.

19. The method according to claim 18 wherein the step of fitting each of the frequency pairs further comprises:

calculating a weight for the subsequent pair for each of the frequency pairs.

20. The method according to claim 18 wherein the orthogonalization algorithm comprises the Gram-Schmidt algorithm or the modified Gram-Schmidt algorithm.

21. A method of estimating a speed of a motor using a current wave sensed at the motor, the method comprising:

determining a correlation between a current wave sensed at the motor and frequency pairs from a set of weighted frequency pairs representing the current wave;

fitting components of a motor control signal to a corresponding number of first orthogonal pairs in a set of weighted orthogonal pairs, the orthogonal pairs being orthogonal to the frequency pairs;

fitting each of the frequency pairs as the orthogonal pair subsequent to the first orthogonal pairs;

determining a reduction for each of the frequency pairs in a mean squared error between the current wave and the set of weighted orthogonal pairs according to a mean squared error between the current wave and the first orthogonal pairs;

determining the reductions that satisfy a criteria and the corresponding frequency pairs;

removing unwanted frequencies from the determined corresponding frequency pairs; and comparing the remaining frequencies from the determined corresponding frequency pairs with a motor speed harmonic model to determine an estimate for the speed.

22. The method according to claim 21 wherein the step of determining a correlation comprises:

calculating a zero-filled fast fourier transform of the current wave using the frequency pairs, wherein the frequency pairs correspond to frequency index bins of the zero-filled fast fourier transform.

23. The method according to claim 21 wherein the step of fitting components of the motor control signal comprises:
determining the orthogonal weights of the first orthogonal based on the values of the components; and
determining the frequency weights of pairs in the set of frequency pairs corresponding to the first orthogonal pairs based on the determined orthogonal weights; and
wherein the step of fitting each of the frequency pairs comprises:
determining the orthogonal weight of the subsequent orthogonal pair for each of the frequency pairs based on the value of each of the frequency pairs; and
determining the frequency weight of a pair in the set of weighted frequency pairs corresponding to the subsequent pair based on the determined orthogonal weight of the subsequent orthogonal pair for each of the frequency pairs.

24. The method according to claim 21 wherein the step of fitting components of the motor control signal comprises:
determining if a previous motor speed is classified as low;
fitting a drive frequency component of the motor control signal as a first pair of the orthogonal pairs; and
fitting a supplemental frequency component of the motor control signal as a second pair of the orthogonal pairs if the previous motor speed is classified as low.

25. The method according to claim 21 wherein the step of identifying comprises:
determining a mean squared error between the first orthogonal pairs and the current wave; and
determining reductions in the mean squared error between the orthogonal pairs and the current wave based on the addition of each of the frequency pairs as the subsequent orthogonal pair.

26. A method of estimating a motor speed comprising:
determining a correlation between a current wave sensed at the motor and frequency pairs from a set of weighted frequency pairs representing the current wave;
fitting components of a motor control signal to a corresponding number of first orthogonal pairs in a set of weighted orthogonal pairs, the orthogonal pairs being orthogonal to the frequency pairs;
comparing a subharmonic from the current wave with a harmonics speed model to identify regions in which to locate a corresponding harmonic, the subharmonic having a frequency less than a motor control signal;
identifying a harmonics pair of frequencies in the regions having a separation from each other of no greater than a smallest harmonic of the motor control signal, wherein one of the frequencies is the harmonics pair of the corresponding harmonic; and
comparing the harmonics pair with the harmonics speed model to determine an estimate for the speed.

27. The method according to claim 26 wherein the step of determining a correlation comprises:
calculating a zero-filled fast fourier transform of the current wave using the frequency pairs, wherein the frequency pairs correspond to frequency index bins of the zero-filled fast fourier transform.

28. The method according to claim 26 wherein the step of fitting components of the motor control signal comprises:
determining the orthogonal weights of the first orthogonal pairs based on the values of the components; and
determining the frequency weights of pairs in the set of frequency pairs corresponding to the first orthogonal pairs based on the determined orthogonal weights.

29. The method according to claim 26 wherein the step of fitting components of the motor control signal comprises:
determining if a previous motor speed is classified as low;
fitting a drive frequency component of the motor control signal as a first pair of the orthogonal pairs; and
fitting a supplemental frequency component of the motor control signal as a second pair of the orthogonal pairs if the previous motor speed is classified as low.

30. The method according to claim 26 wherein the step of comparing a subharmonic comprises:
searching the current wave for subharmonics between 0 Hz and the frequency of the motor control signal using real-time fast orthogonal searching.

31. The method according to claim 26 wherein the step of identifying a pair of frequencies comprises:
searching for harmonic frequencies of the subharmonics in the regions using real-time fast orthogonal searching;
determining the harmonics pairs from frequencies in the regions that have a separation from each other of no greater than a smallest harmonic of the motor control signal.

32. The method according to claim 26 wherein the step of comparing comprises:
selecting the harmonics pairs having the greatest distance from harmonics of the motor control signal; and
comparing the selected pairs with the motor speed harmonic model to determine an estimate for the speed.

33. A system for estimating a motor speed comprising:
a correlation mechanism for determining a correlation between a current wave sensed at the motor and frequency pairs from a set of weighted frequency pairs representing the current wave;
a fitting mechanism for fitting components of a motor control signal to at corresponding number of first orthogonal pairs in a set of weighted orthogonal pairs and fitting each of the frequency pairs as the orthogonal pair subsequent to the first orthogonal pairs, the orthogonal pairs being orthogonal to the frequency pairs;
an mse reduction mechanism for determining a reduction in the mean squared error between the current wave and the set of weighted orthogonal pairs;
a pair comparison mechanism for identifying the frequency pairs having a reduction that satisfies a criteria;
a speed estimation mechanism for comparing desired frequencies from the identified frequency pairs with a motor speed harmonic model to determine an estimation of the speed; and
a controller in communication with the correlation mechanism, the fitting mechanism, the mse reduction mechanism and the speed estimation mechanism for coordinating the process of estimating the motor speed.

34. The system according to claim 33 further comprising:
an mse mechanism for determining a mean squared error between the current wave and the orthogonal pairs.

35. The system according to claim 33 further comprising:
a harmonics recognition mechanism for removing frequencies that are harmonics of the components of the motor control signal from the identified frequency pairs to form the desired frequencies.

36. The system according to claim 33 wherein the fitting mechanism comprises:
an orthogonal weights mechanism for determining the orthogonal weight for an orthogonal pair from the set of weighted orthogonal pairs based on the value of one of the frequency pairs; and
a frequency weights mechanism for determining the frequency weight for a frequency pair from the set of weighted frequency pairs based on the corresponding orthogonal weight.

37. The system according to claim 33 further comprising:
a CDF analysis mechanism for determining if a previous motor speed is classified as low and providing a supplement frequency component of the motor control signal to the fitting mechanism to be fit as a second pair of the orthogonal pairs if the previous motor speed is classified as low.

38. The system according to claim 37 further comprising:
a harmonics identification mechanism for locating harmonics in the regions.

39. A system for estimating a motor speed comprising:
a correlation mechanism for determining a correlation between a current wave sensed at the motor and frequency pairs from a set of weighted frequency pairs representing the current wave;
a fitting mechanism for fitting components of a motor control signal to a corresponding number of first orthogonal pairs in a set of weighted orthogonal pairs, the orthogonal pairs being orthogonal to the frequency pairs;
a region determination mechanism for comparing a subharmonic from the current wave with a harmonics speed model to identify two regions in which to locate a corresponding harmonic, the subharmonic having a frequency less than a motor control signal;
a corresponding frequencies mechanism for identifying a harmonics pair of frequencies in the two regions having a separation from each other no greater than a smallest harmonic of the motor control signal, wherein one f the frequencies in the harmonics pair is the corresponding harmonic;
a speed estimation mechanism for comparing desired frequencies from the identified harmonics pairs with a harmonics speed model to determine an estimation of the speed; and
a controller in communication with the correlation mechanism, the fitting mechanism, the mse reduction mechanism and the speed estimation mechanism for coordinating the process of estimating the motor speed.

40. The system according to claim 39 wherein the fitting mechanism comprises:
an orthogonal weights mechanism for determining the orthogonal weight for an orthogonal pair from the set of weighted orthogonal pairs based on the value of one of the frequency pairs; and
a frequency weights mechanism for determining the frequency weight for a frequency pair from the set of weighted frequency pairs based on the corresponding orthogonal weight.

41. The system according to claim 39 further comprising:
a CDF analysis mechanism for determining if a previous motor speed is classified as low and providing a supplement frequency component of the motor control signal to the fitting mechanism to be fit as a second pair of the orthogonal pairs if the previous motor speed is classified as low.

42. The system according to claim 39 further comprising:
a subharmonics mechanism for searching the current wave for subharmonics between 0 Hz and the frequency of the motor control signal.

43. A computer readable medium having stored thereon computer-executable instructions for estimating a speed of a motor comprising:
a) determining a correlation between a current wave sensed at the motor and frequency pairs from a set of weighted frequency pairs representing the current wave;
b) fitting components of a motor control signal to a corresponding number of first orthogonal pairs in a set of weighted orthogonal pairs, the orthogonal pairs being orthogonal to the frequency pairs;
c) fitting each of the frequency pairs as the orthogonal pair subsequent to the first orthogonal pairs;
d) identifying the frequency that provide a reduction in the mean squared error between the current wave and the set of weighted orthogonal pairs that satisfies a criteria; and
e) comparing desired frequencies from the identified frequency pairs with a motor speed harmonic model to determine an estimation of the speed.

44. A computer readable medium having stored thereon computer-executable instructions for estimating a motor speed comprising:
determining a correlation between a current wave sensed a the motor and frequency pairs from a set of weighted frequency pairs representing the current wave;
fitting components of a motor control signal to a corresponding number of first orthogonal pairs in a set of weighted orthogonal pairs, the orthogonal pairs being orthogonal to the frequency pairs;
comparing a subharmonic from the current wave with a harmonics speed model to identify regions in which to locate a corresponding harmonic, the subharmonic having a frequency less than a motor control signal;
identifying a pair of frequencies in the regions having a separation from each other no greater than a smallest harmonic of the motor control signal, wherein one of the frequencies in the pair is the corresponding harmonic; and
comparing the pair of frequencies with the motor speed harmonic model to determine an estimate for the speed.

45. A computer readable medium having stored thereon computer-executable instructions for estimating a speed of a motor using a current wave sensed at the motor, the method comprising:
determining a correlation between a current wave sensed at the motor and frequency pairs from a set of weighted frequency pairs representing the current wave;
fitting components of a motor control signal to a corresponding number of first orthogonal pairs in a set of weighted orthogonal pairs, the orthogonal pairs being orthogonal to the frequency pairs;
fitting each of the frequency pairs as the orthogonal pair subsequent to the first orthogonal pairs;
determining a reduction for each of the frequency pairs in a mean squared error between the current wave and the set of weighted orthogonal pairs according to a mean squared error between the current wave and the first orthogonal pairs;
determining the reductions that satisfy a criteria and the corresponding frequency pairs;
removing unwanted frequencies from the determined corresponding frequency pairs; and
comparing the remaining frequencies from the determined corresponding frequency pairs with a motor speed harmonic model to determine an estimate for the speed.

* * * * *

UNITED STATES PATENT AND TRADEMARK OFFICE
CERTIFICATE OF CORRECTION

| | | |
|---|---|---|
| PATENT NO. | : 6,876,944 B2 | |
| DATED | : April 5, 2005 | |
| INVENTOR(S) | : McGaughey, Donald R. et al. | |

It is certified that error appears in the above-identified patent and that said Letters Patent is hereby corrected as shown below:

Column 2,
Line 66, "one f the" should read -- one of the --.

Column 4,
Line 66, "DF 1118" should read -- CDF 118 --.

Column 7,
Line 3, "known that that the" should read -- known that the --.

Column 14,
Line 46, "product.")"" should read -- product). --.

Column 19,
Lines 31-57, claims 38-42 should read as follows:
38. A system for estimating a motor speed comprising:

a correlation mechanism for determining a correlation between a current wave sensed at the motor and frequency pairs from a set of weighted frequency pairs representing the current wave;

a fitting mechanism for fitting components of a motor control signal to a corresponding number of first orthogonal pairs in a set of weighted orthogonal pairs, the orthogonal pairs being orthogonal to the frequency pairs;

a region determination mechanism for comparing a subharmonic from the current wave with a harmonics speed model to identify two regions in which to locate a corresponding harmonic, the subharmonic having a frequency less than a motor control signal;

a corresponding frequencies mechanism for identifying a harmonics pair of frequencies in the two regions having a separation from each other no greater than a smallest harmonic of the motor control signal, wherein one of the frequencies in the harmonics pair is the corresponding harmonic;

a speed estimation mechanism for comparing desired frequencies from the identified harmonics pairs with a harmonics speed model to determine an estimation of the speed; and

UNITED STATES PATENT AND TRADEMARK OFFICE
CERTIFICATE OF CORRECTION

PATENT NO. : 6,876,944 B2
DATED : April 5, 2005
INVENTOR(S) : McGaughey, Donald R. et al.

It is certified that error appears in the above-identified patent and that said Letters Patent is hereby corrected as shown below:

Column 19 (cont.),
a controller in communication with the correlation mechanism, the fitting mechanism, the mse reduction mechanism and the speed estimation mechanism for coordinating the process of estimating the motor speed.

Signed and Sealed this

Fourth Day of October, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,876,944 B2 |
| APPLICATION NO. | : 10/777113 |
| DATED | : April 5, 2005 |
| INVENTOR(S) | : Donald R. McGaughey et al. |

It is certified that error appears in the above-identified patent and that said Letters Patent is hereby corrected as shown below:

<u>Column 2,</u>
Line 66, one f the" should read -- one of the --.

<u>Column 4,</u>
Line 66, "DF 1118" should read -- CDF 118 --.

<u>Column 7,</u>
Line 3, "known that that the" should read -- known that the --.

<u>Column 14,</u>
Line 46, "product.""" should read -- product). --.

<u>Column 19,</u>
Lines 31-57, claims 38-42 should read as follows:
38. A system for estimating a motor speed comprising:

a correlation mechanism for determining a correlation between a current wave sensed at the motor and frequency pairs from a set of weighted frequency pairs representing the current wave;

a fitting mechanism for fitting components of a motor control signal to a corresponding number of first orthogonal pairs in a set of weighted orthogonal pairs, the orthogonal pairs being orthogonal to the frequency pairs;

a region determination mechanism for comparing a subharmonic from the current wave with a harmonics speed model to identify two regions in which to locate a corresponding harmonic, the subharmonic having a frequency less than a motor control signal;

a corresponding frequencies mechanism for identifying a harmonics pair of frequencies in the two regions having a separation from each other no greater than a smallest harmonic of the motor control signal, wherein one of the frequencies in the harmonics pair is the corresponding harmonic;

a speed estimation mechanism for comparing desired frequencies from the identified harmonics pairs with a harmonics speed model to determine an estimation of the speed; and a controller in communication with the correlation mechanism, the fitting mechanism, the mse reduction mechanism and the speed estimation mechanism for coordinating the process of estimating the motor speed.

UNITED STATES PATENT AND TRADEMARK OFFICE
CERTIFICATE OF CORRECTION

| | |
|---|---|
| PATENT NO. | : 6,876,944 B2 |
| APPLICATION NO. | : 10/777113 |
| DATED | : April 5, 2005 |
| INVENTOR(S) | : Donald R. McGaughey et al. |

It is certified that error appears in the above-identified patent and that said Letters Patent is hereby corrected as shown below:

Column 19 (cont.)

39. The system according to claim 38 wherein the fitting mechanism comprises:

an orthogonal weights mechanism for determining the orthogonal weight for an orthogonal pair from the set of weighted orthogonal pairs based on the value of one of the frequency pairs; and a frequency weights mechanism for determining the frequency weight for a frequency pair from the set of weighted frequency pairs based on the corresponding orthogonal weight.

40. The system according to claim 38 further comprising:

a CDF analysis mechanism for determining if a previous motor speed is classified as low and providing a supplement frequency component of the motor control signal to the fitting mechanism to be fit as a second pair of the orthogonal pairs if the previous motor speed is classified as low.

41. The system according to claim 38 further comprising:

a subharmonics mechanism for searching the current wave for subharmonics between 0Hz and the frequency of the motor control signal.

UNITED STATES PATENT AND TRADEMARK OFFICE
CERTIFICATE OF CORRECTION

PATENT NO. : 6,876,944 B2
APPLICATION NO. : 10/777113
DATED : April 5, 2005
INVENTOR(S) : Donald R. McGaughey et al.

It is certified that error appears in the above-identified patent and that said Letters Patent is hereby corrected as shown below:

Column 19 (cont.)

42. The system according to claim 38 further comprising:

a harmonics identification mechanism for locating harmonics in the regions.

This certificate supersedes the Certificate of Correction issued October 4, 2005.

Signed and Sealed this

First Day of April, 2008

JON W. DUDAS
*Director of the United States Patent and Trademark Office*